(12) United States Patent
Newcomb et al.

(10) Patent No.: US 9,926,476 B2
(45) Date of Patent: Mar. 27, 2018

(54) DUAL CURE EPOXY ADHESIVES

(71) Applicant: Addison Clear Wave Coatings Inc., St. Charles, IL (US)

(72) Inventors: Martin Newcomb, St. Charles, IL (US); Chau Ha, St. Charles, IL (US); John H. Horner, St. Charles, IL (US)

(73) Assignee: ADDISON CLEAR WAVE COATINGS INC., St. Charles, IL (US)

( * ) Notice: Subject to any disclaimer, the term of this patent is extended or adjusted under 35 U.S.C. 154(b) by 0 days.

(21) Appl. No.: 15/180,207

(22) Filed: Jun. 13, 2016

(65) Prior Publication Data

US 2017/0306198 A1 Oct. 26, 2017

Related U.S. Application Data

(60) Provisional application No. 62/326,530, filed on Apr. 22, 2016.

(51) Int. Cl.
| | | |
|---|---|---|
| *C08F 2/46* | (2006.01) | |
| *C08F 2/50* | (2006.01) | |
| *C08G 61/04* | (2006.01) | |
| *C09J 163/00* | (2006.01) | |
| *C09J 11/04* | (2006.01) | |

(52) U.S. Cl.
CPC ............ *C09J 163/00* (2013.01); *C09J 11/04* (2013.01)

(58) Field of Classification Search
USPC .......... 522/55, 49, 6, 71, 189, 184, 1; 520/1
See application file for complete search history.

(56) References Cited

U.S. PATENT DOCUMENTS

| | | | | |
|---|---|---|---|---|
| 4,225,691 A | * | 9/1980 | Crivello | C08G 59/68 264/328.2 |
| 4,238,587 A | | 12/1980 | Crivello | |
| 4,275,190 A | | 6/1981 | Dudgeon | |
| 4,404,355 A | | 9/1983 | Eldin et al. | |
| 6,372,350 B1 | | 4/2002 | Scott et al. | |
| 7,078,444 B2 | * | 7/2006 | Lamanna | G03F 7/0045 430/270.1 |
| 2005/0092428 A1 | * | 5/2005 | Crivello | C08G 59/18 156/273.3 |
| 2007/0066698 A1 | * | 3/2007 | Yang | B32B 5/18 522/6 |
| 2009/0181263 A1 | * | 7/2009 | Yokota | C08G 59/24 428/704 |

FOREIGN PATENT DOCUMENTS

WO 98/33645 8/1998

* cited by examiner

*Primary Examiner* — Jessica Whiteley
(74) *Attorney, Agent, or Firm* — Miller, Matthias & Hull LLP (57) ABSTRACT

A dual cure, all epoxy adhesive that is both photochemically and thermally curable is disclosed. The adhesive may comprise at least about 93% by weight of one or more polymerizable epoxides, a catalytic amount of a photo-acid generator (PAG) configured to induce acid-catalyzed polymerization of the polymerizable epoxide when exposed to UV or visible light, about 0.01% to about 1% by weight of a redox agent, and a catalytic amount of a thermal acid generator (TAG) configured to induce acid-catalyzed polymerization of the polymerizable epoxide in the presence of the redox agent when exposed to a temperature at or above about 70° C.

15 Claims, 4 Drawing Sheets

DUAL CURE EPOXY ADHESIVES

CROSS-REFERENCE TO RELATED APPLICATION

This application is a non-provisional application claiming the benefit of the earlier filing date of U.S. provisional application Ser. No. 62/326,530 filed on Apr. 22, 2016.

TECHNICAL FIELD

The present disclosure relates to dual cure, all epoxy adhesive compositions that are curable both photochemically and thermally and, more specifically, to such epoxy adhesive compositions that undergo acid-catalyzed polymerization when exposed to UV light or heat.

BACKGROUND

Semiconductor and optoelectronic packaging encompasses various processes involved in assembling, connecting, and bonding components of semiconductor or optoelectronic devices. As the sizes of such devices have become increasingly miniaturized, adhesives are increasingly being used for packaging applications in place of mechanical connecting elements, such as clamping devices and threaded connections. Small semiconductor and optoelectronic devices typically require precise alignment of components with fine tolerances (usually <1 micron), so-called "active alignment" by those in the industry, such that adhesives used for packaging small semiconductor and optoelectronic devices should be capable of meeting such processing demands.

Moreover, as such devices frequently include shaded regions between components which see limited to no light exposure, current adhesives used in semiconductor or optoelectronic packaging applications may be "dual cure" adhesives which are curable both photochemically and thermally. In particular, portions of the adhesive that are exposed to light may be cured photochemically (e.g., with UV light), sometimes within seconds, to fix the components together in alignment within a desired tolerance limit. The remaining portions of the adhesive that are buried from light in the shaded regions are then heat treated to complete the curing process. However, in the case of camera modules, for example, miniaturization has also led to the use of high refractive index lenses fabricated from polycarbonate (PC), modified PC, or other similar plastics that may melt or deform when exposed to high temperatures (>90° C.). Accordingly, current dual cure adhesives used for such applications should be capable of curing at relatively low temperatures to maintain the integrity of heat sensitive materials.

Current dual cure adhesives used for packaging of electronic/optoelectronic devices, including camera modules, are often hybrid resins containing an acrylate, acrylated bis-maleimide (BMI), acrylated urethane, or other similar acrylated resins that cure by radical polymerization in the presence of low temperature heat, and an epoxy resin that cures by acid-catalyzed polymerization when exposed to UV light. However, although epoxy adhesives are well known to outperform acrylate and BMI adhesives in terms of superior adhesion and environmental properties (e.g., water permeation, etc.), there are currently no known commercially available dual cure, epoxy only adhesives that are curable both photochemically and thermally at low temperatures needed for temperature sensitive components, such as polycarbonate lenses.

Epoxy adhesives may be grouped into two categories depending on how curing is initiated: thermally curable epoxy adhesives, and photochemically curable epoxy adhesives. Thermally curable epoxy adhesives may be further divided into two groups depending on the polymerization mechanism. Specifically, thermally curable epoxy adhesives may be grouped into those that polymerize by condensation of an epoxide with another functional groups such as an amine or an anhydride (so-called "two-part" systems), and those that undergo acid-catalyzed polymerization (single component systems). The two-part epoxide condensation systems are incompatible with acid-catalyzed polymerization due to their basic components.

U.S. Pat. Nos. 4,225,691 and 4,238,587 describe resin compositions containing a polymerizable epoxy resin, diaryliodonium salts, and copper-based redox agents that undergo thermal curing at low temperatures via acid-catalyzed polymerization. While effective, the resin compositions disclosed therein are so reactive that they may gelate in a matter of minutes or hours. Thus, such epoxy resin compositions may be difficult to handle, and should be prepared immediately before use.

Thus, it can be seen that there is a need for dual cure, all epoxy adhesives that can be stored at room temperature for significant periods without gelating. Moreover, there is a need for such adhesives that are compatible with the processing demands of active alignment, and are curable at low temperatures for temperature-sensitive applications such as small camera module assembly applications.

SUMMARY

In accordance with one aspect of the present disclosure, a dual cure, all epoxy adhesive that is both photochemically and thermally curable is disclosed. The dual cure, all epoxy adhesive may comprise at least about 93% by weight of one or more polymerizable epoxides, a catalytic amount of a photo-acid generator (PAG) configured to induce acid-catalyzed polymerization of the polymerizable epoxide when exposed to UV light, about 0.01% to about 1% by weight of a redox agent, and a catalytic amount of a thermal acid generator (TAG) configured to induce acid-catalyzed polymerization of the polymerizable epoxide in the presence of the redox agent when exposed to a temperature at or above about 70° C.

In accordance with another aspect of the present disclosure, a dual cure, all epoxy adhesive that is both photochemically and thermally curable is disclosed. The dual cure, all epoxy adhesive may comprise at least about 93% by weight of one or more polymerizable epoxides, a catalytic amount of a photo-acid generator (PAG) configured to induce acid-catalyzed polymerization of the polymerizable epoxide when exposed to UV or visible light (200-500 mn), and about 0.01% to about 1% by weight of a redox agent selected from the group consisting of copper(II) salts, iron (III) salts, titanium(IV) salts, or titanium(IV) compounds. The adhesive may further comprise a catalytic amount of a thermal acid generator (TAG) configured to induce acid-catalyzed polymerization of the polymerizable epoxide in the presence of the redox agent when exposed to temperatures in a range of about 70° C. to about 130° C., and about 0.05% to about 1.0% by weight of a sacrificial reducing agent.

In another aspect of the present disclosure, a dual cure, all epoxy adhesive that is both photochemically and thermally curable is disclosed. The dual cure, all epoxy adhesive may comprise at least about 93% by weight of one or more polymerizable epoxides, a catalytic amount of a photo-acid generator (PAG) configured to induce acid-catalyzed polymerization of the polymerizable epoxide when exposed to UV or visible light (200-500 nm), about 0.01% to about 0.2% by weight of a copper(II) salt, and a catalytic amount of a thermal acid generator (TAG) configured to induce acid-catalyzed polymerization of the polymerizable epoxide in the presence of the copper(II) salt when exposed to a temperature at or about 70° C. The dual cure, all epoxy adhesive may be stable for at least about five days when stored at room temperature in a light-protected container.

DETAILED DESCRIPTION

The present disclosure relates to dual cure, all epoxy adhesives that may be employed for various applications including, but not limited to, semiconductor and optoelectronic packaging applications. As disclosed herein, a "dual cure, all epoxy adhesive" is an epoxy adhesive composition that is curable both photochemically and thermally, wherein the only curable/polymerizable substance in the composition is one or more epoxide compounds. Accordingly, the dual cure, all epoxy adhesives disclosed herein are free of other curable/polymerizable components such as, but not limited to, acrylate resins (any acrylate salt, acrylic acid, or acrylate ester containing resin), acrylated bis-maleimide (BMI) resins, and urethane resins (including acrylated urethane resins). The epoxy adhesive compositions disclosed herein undergo acid-catalyzed polymerization upon exposure to UV or visible light (about 200 nm to about 500 nm), or upon exposure to relatively low temperatures ranging from about 70° C. to about 130° C. As such, the epoxy adhesives may be used to assemble devices having temperature-sensitive components, such as camera modules having polycarbonate lenses.

Figure 1:
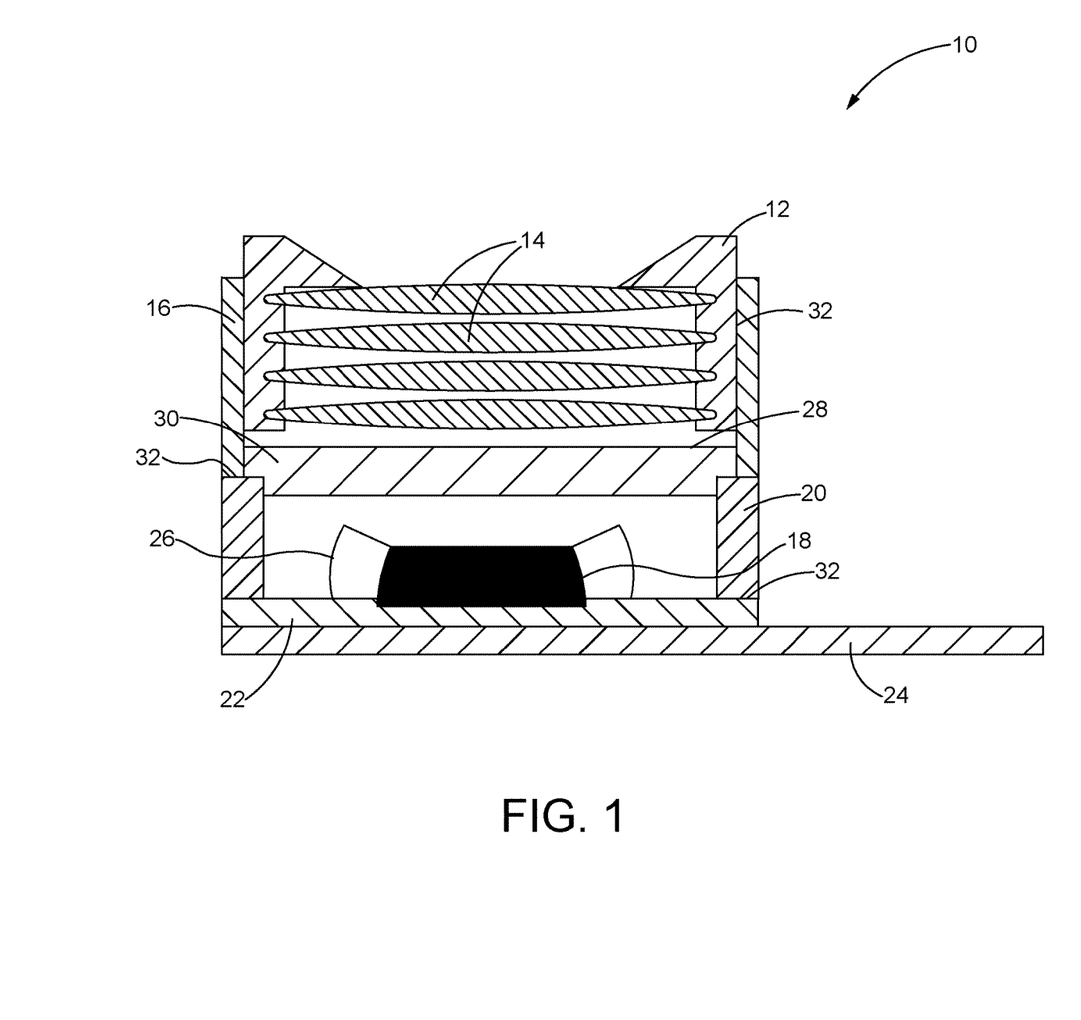
FIG. 1 is a cross-sectional view of a camera module assembled using a dual cure, all epoxy adhesive, constructed in accordance with the present disclosure.

Referring now to FIG. 1, a camera module 10 assembled using the dual cure, all epoxy adhesive disclosed herein is shown. The camera module 10 may include a lens barrel 12 holding one or more polycarbonate lenses 14, and a lens housing 16 for the lens barrel 12. In addition, the camera module 10 may further include an image sensor 18 enclosed in a sensor case 20 that is mounted on a printed circuit board (PCB) 22 and a flex printed circuit board (FPCB) 24, with wires 26 connecting the image sensor 18 to the PCB 22. An infrared (IR) filter 28 and a glass lid 30 may separate the polycarbonate lenses 14 and the image sensor 18, as shown.

In contrast to older designs in which the lens housing is threaded so that the lens barrel can be screwed in place, the lens barrel 12 of the camera module 10 of FIG. 1 is bonded to the lens housing 16 using the dual cure, all epoxy adhesive. Namely, the dual cure, all epoxy adhesive is applied at the bonding interface between the lens barrel 12 and the lens housing 16, and the components are held in alignment while exposed to UV light for a brief period to photochemically cure the adhesive and fix the alignment within the desired tolerance limit. The UV light may be supplied from any suitable UV light source such as a monochromatic light source (e.g., a light-emitting diode (LED) that provides 365 nm or other wavelength monochromatic light), or a mercury lamp that provides UV light in a range of about 200 nm to >400 nm.

In a subsequent step, the adhesive buried in shaded regions 32 between the lens barrel 12 and the lens housing 16 is then cured thermally by exposure to low temperature heat (<90° C.) to complete the curing process while avoiding melting or deformation of the temperature-sensitive polycarbonate lenses 14. In a similar way, other shaded regions 32 between components of the module 10 may be bonded using the dual cure, all epoxy adhesive by exposure to low temperature heat, such as those between the glass lid 30 and the sensor case 20/lens housing 16 and between the sensor case 20 and the PCB 22.

Figure 2:
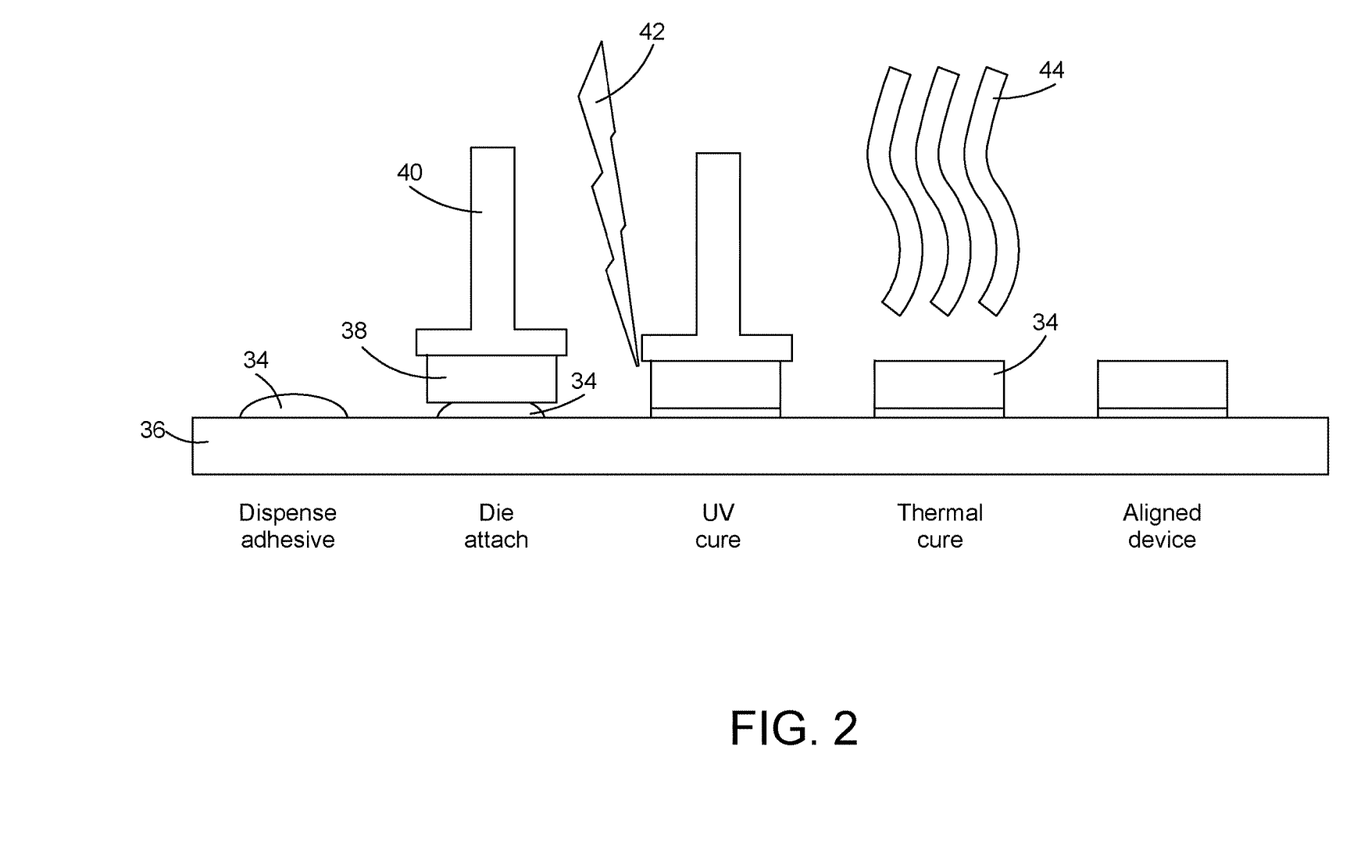
FIG. 2 is a schematic representation of steps involved in manufacture of an actively aligned device using the dual cure, all epoxy adhesive, constructed in accordance with the present disclosure.

Turning now to FIG. 2, the use of the dual cure, all epoxy adhesive in a die attach process (chip bonding) for an electronic device is schematically depicted. In particular, the adhesive 34 may be dispensed on a substrate 36, and a die 38 (or chip) may be placed on the adhesive 34 and held in an aligned position using an alignment device 40. Brief exposure of the adhesive 34 to UV light 42 may fix the alignment of the die 38 on the substrate 36 by curing the portions of the adhesive 34 that are exposed to the light 42. The aligned part may then be treated with heat 44 to cure the portions of the adhesive 34 buried from light exposure to complete the curing process and provide the aligned device. It is noted that FIGS. 1-2 illustrate only two examples of practical applications of the dual cure, all epoxy adhesive disclosed herein. It will be understood that the adhesive composition disclosed herein may be used in any application having shaded regions, temperature-sensitive materials, and/or a requirement for active alignment. It may also be used in any application that may benefit from the adhesion and/or environmental performance characteristics of an all epoxy adhesive.

The dual cure, all epoxy adhesive disclosed herein may have the following composition:

(1) at least about 93% by weight of one or more polymerizable epoxides;

(2) a catalytic amount of a photo-acid generator (PAG) that is configured to induce acid-catalyzed polymerization of the polymerizable epoxide when exposed to UV or visible light;

(3) about 0.01% to about 1% by weight of a redox agent;

(4) a catalytic amount of a thermal acid generator (TAG) configured to induce acid-catalyzed polymerization of the polymerizable epoxide in the presence of the redox agent when exposed to temperatures in the range of about 70° C. and about 130° C.; and (5) optionally, about 0.05% to about 0.5% by weight of a sacrificial reducing agent.

As noted above, the adhesive compositions disclosed herein are free of any acrylate compounds including acrylate salts, acrylic acids, acrylate esters, acrylated bis-maleimide (BMI) derivatives, and acrylated urethanes. Details of each of the ingredients listed above, as well as other optional additives, are described in the following paragraphs.

Polymerizable Epoxides

The adhesive compositions disclosed herein may contain between about 93% to about 99% by weight of one or more polymerizable epoxide compounds, including mixtures of different polymerizable epoxide compounds. The polymerizable epoxides may be commercially available or prepared synthetically. Non-limiting examples of suitable commercially available epoxide compounds include 3,4-epoxycyclohexylmethyl-3',4'-epoxycyclohexancarboxylate, the diglycidyl ester of hexahydrophthalic acid, 2,2-bis[4-(glycidyloxy)phenyl]propane, and bisphenol A diglycidyl ether, bisphenol F diglycidyl ether, among others.

Photo-Acid Generators (PAGs)

The epoxy adhesives disclosed herein may contain catalytic amounts (e.g., about 0.05% to about 3% by weight) of one or more PAGs that induce acid-catalyzed polymerization of the polymerizable epoxides when exposed to UV or visible light. Suitable PAGs may be selected from known photochemical active "onium" salts (e.g., sulfoniums, iodoniums, etc.) as well as neutral compounds (e.g., sulfonate esters) that react in the presence of UV light to generate a "superacid" that induces acid-catalyzed polymerization of the polymerizable epoxide(s). As is understood by those with ordinary skill in the art, a superacid is an acid that has an acidity that is greater than 100% sulfuric acid. For example, the PAG may be a sulfonium salt having a counterion that becomes protonated upon UV light exposure to form a superacid. Alternatively, the PAG may be a sulfonate ester that hydrolyzes when exposed to UV light to form a superacid. In particular, the superacids generated by the PAGs may include a conjugate base that does not bind a proton well such as hexafluorophosphate, hexafluoroantimonate, sulfonate, and tetrakis(pentafluorophenyl)borate, among others. In this regard, of particular interest are commercially available PAGs that react in the presence of 365 nm light including diphenyl[4-(phenylthio)phenyl]sulfonium hexafluoroantimonate (PAG-A), diphenyl[4-(phenylthio)phenyl]sulfonium hexafluorophosphate (PAG-B), a mixture of diphenyl[4-(phenylthio)phenyl]sulfonium bis(heptafluoropropyl)tetrafluorophosphate and diphenyl[4-(phenylthio)phenyl]sulfonium tris(heptafluoropropyl)trifluorophosphate (PAG-C), a mixture of diphenyl[4-(phenylthio)phenyl]sulfonium hexafluoroantimonate and bis(4-diphenylthiophenyl)sulfide bis(hexafluoroantimonate) (PAG-D), a mixture of diphenyl[4-(phenylthio)phenyl]sulfonium hexafluorophosphate and bis(4-diphenylthiophenyl)sulfide bis(hexafluorophosphate) (PAG-E), tris[4-(4-acetylphenylthio)phenyl]sulfonium tetrakis(pentafluorophenyl)borate (PAG-F), tris[4-(4-acetylphenylthio)phenyl]sulfonium tris(trifluoromethylsulfonyl)methide (PAG-G), and 2,3-dihydro-α-(2-methylphenyl)-2-[[[(4-methylphenyl)sulfonyl]oxy]imino]-thiopheneacetonitrile (PAG-H). The structures of the aforementioned PAGs are provided in Table 1. Other PAGs not listed in Table 1 that are capable of inducing acid-catyalzed epoxy polymerization when exposed to UV light may also be used.

TABLE 1

Structure of PAGs that react at 365 nm

| PAG | Structure |
| --- | --- |
| PAG-A | [diphenyl(4-(phenylthio)phenyl)sulfonium cation with $SbF_6^-$ anion] |
| PAG-B | [diphenyl(4-(phenylthio)phenyl)sulfonium cation with $PF_6^-$ anion] |
| PAG-C | [diphenyl(4-(phenylthio)phenyl)sulfonium cation with $(C_3F_7)_n F_{(6-n)} P^-$ (n = 2 or 3)] |

TABLE 1-continued

Structure of PAGs that react at 365 nm

| PAG | Structure |
| --- | --- |
| PAG-D | Triphenylsulfonium (4-phenylthiophenyl)diphenylsulfonium hexafluoroantimonate / bis-sulfonium bis(hexafluoroantimonate) mixture |
| PAG-E | Triphenylsulfonium (4-phenylthiophenyl)diphenylsulfonium hexafluorophosphate / bis-sulfonium bis(hexafluorophosphate) mixture |
| PAG-F | Tris[4-(4-acetylphenylthio)phenyl]sulfonium tetrakis(pentafluorophenyl)borate |
| PAG-G | Tris[4-(4-acetylphenylthio)phenyl]sulfonium tris(trifluoromethylsulfonyl)methide |
| PAG-H | (2-methylphenyl)(2-(tosyloxyimino)-2,3-dihydrothiophen-3-yl)acetonitrile |

The PAGs listed in Table 1 may react to generate a superacid upon exposure to monochromatic 365 nm light, such as from an LED light source. The PAGs may also react upon exposure to UV-visible light in the range of about 200 nm to about 500 nm, such as from a mercury or mercury-halogen lamp. Photochemical curing reaction times may vary from fractions of second to about 300 seconds, or even longer in some cases.

Thermal-Acid Generators (TAGs)

The epoxy adhesives of the present disclosure may further contain catalytic amounts (e.g., about 0.05% to about 3% by weight) of one or more TAGs that induce acid-catalyzed polymerization of epoxides when exposed to heat. The TAGs may include one or more diaryliodonium salts having a counterion that is a conjugate base of a superacid such as, but not limited to, hexafluorophosphate, hexafluoroantimonate, tetrakis(pentafluorophenyl)borate, bis(hepatfluoropropyl)tetrafluorophosphate, tris(heptafluoropropyl)trifluorophosphate, triflate, and perfluoro-1-butanesulfonate. For example, suitable TAGs may include, but are not limited to, p-(octyloxyphenyl)phenyliodonium hexafluoroantimonate (TAG-A), (p-isopropylphenyl)(p-methylphenyl)iodonium tetrakis(pentafluorophenyl)borate (TAG-B), a mixture of (p-isopropylphenyl)(p-methylphenyl)iodonium bis(heptafluoropropyl)tetrafluorophosphate and (p-isopropylphenyl) (p-methylphenyl)iodonium tris(heptafluoropropyl)trifluorophosphate (TAG-C), bis(4-methylphenyl)iodonium triflate (TAG-D), bis(4-tert-butylphenyl)iodonium perfluoro-1-butanesulfonate (TAG-E), and (p-isobutylphenyl)(p-methylphenyl)iodonium hexafluorophosphate (TAG-F). The structures of the aforementioned TAGs are provided in Table 2. However, other TAGs not listed in Table 2 may also be used.

TABLE 2

Structure of TAGs

| TAG | Structure |
| --- | --- |
| TAG-A | [diaryliodonium structure with $O-C_8H_{17}$ substituent and $F_6Sb^{\ominus}$ counterion] |
| TAG-B | [diaryliodonium structure with methyl and isopropyl substituents and tetrakis(pentafluorophenyl)borate counterion] |
| TAG-C | [diaryliodonium structure with methyl and isopropyl substituents and $(C_3H_7)_n PF_{(6-n)}^{\ominus}$ counterion (n = 2 or 3)] |
| TAG-D | [bis(4-methylphenyl)iodonium with $O-S(=O)_2-CF_3^{\ominus}$ (triflate) counterion] |
| TAG-E | [bis(4-tert-butylphenyl)iodonium with $O-S(=O)_2-C_4F_9^{\ominus}$ counterion] |
| TAG-F | [diaryliodonium with methyl and isobutyl substituents and $F_6P^{\ominus}$ counterion] |

In the presence of heat, the diaryliodonium salts may be reduced by the redox agent and undergo subsequent fragmentations and reactions that ultimately lead to liberation of a proton that protonates the counterion to generate the superacid. The generated superacid may then go on to induce acid-catalyzed polymerization of the polymerizable epoxide(s). As explained in further detail below, the temperature and reaction times necessary for thermal curing may vary considerably depending on the concentration and identity of the redox agent as well as the presence and concentration of any sacrificial reducing agents. In general, however, the TAGs disclosed herein may react at relatively low temperatures in the range of about 70° C. to about 130° C., and curing times may vary from minutes to hours. However, the reaction temperatures and times may be tunable based on the concentration and identity of the redox agent, the concentration and identity of any sacrificial reducing agents, as well as other factors.

It is further noted that the diaryliodonium salts of Table 2 may also serve as PAGs if high energy UV light, such as from a mercury or mercury-halogen lamp, is used during the photochemical curing step. In such cases, the epoxy adhesive may function as a dual cure system even in the absence of the PAGs described above. However, in contrast with the PAGs of Table 1, the diaryliodonium salts of Table 2 may generally react with low efficiencies when exposed to monochromatic 365 nm light, thus necessitating the presence of more the reactive PAGs when monochromatic 365 nm light is used for the UV curing step.

Redox Agents

The epoxy adhesive compositions of the present disclosure may further include about 0.01% to about 1% by weight of one or more redox agents that are capable of reducing the TAGs in the presence of heat. Redox agents for this purpose may include, but are not limited to, various copper(II) salts, iron(III) salts, titanium(IV) salts, and titanium(IV) compounds. Of particular interest are copper(II) salts such as, but not limited to, copper(II) acetate, copper(II) trifluoroacetate, copper(II) isobutyrate, copper(II) octanoate, copper (II) palmitate, copper(II) stearate, copper(II) benzoate, copper(II) acetylacetonate, copper(II) trifluoroacetylacetonate, copper(II) hexafluoroacetylacetonate, copper(II) napthenate, copper(II) triflate, and copper(II) methanesufonate, among others. Applicants have found that the copper(II) salts listed above are particularly effective at accelerating the thermal curing reaction, enabling thermal curing reaction temperatures as low as 70° C. in some cases. However, to facilitate storage and handling, the concentrations of the copper(II) salts are carefully optimized in the epoxy adhesive compositions disclosed herein. Specifically, applicants have found that by keeping the copper(II) salt concentrations in a relatively low range (about 0.01% to about 1% by weight), the epoxy adhesive compositions containing copper(II) salt may be stored for relatively long periods (about five days) at room temperature in light-protected containers without significant gelation.

Suitable iron(III) salts may include iron(III) acetate, iron (III) acetylacetonate, and iron(III) tartrate, among others. In addition, suitable titanium(IV) salts and titanium compounds may include, but are not limited to, titanium(IV) isopropoxide, bis(cyclopentadienyl)titanium(IV) bis(trifluoromethansulfonate), and bis(η-5-2,4-cylcopentadien-1-yl)-bis(2,6-difluoro-3-(1H-pyrrol-1-yl)-phenyl) titanium. The structure of bis(η-5-2,4-cylcopentadien-1-yl)-bis(2,6-difluoro-3-(1H-pyrrol-1-yl)-phenyl) titanium is shown below.

For reference, a list of the aforementioned redox agents is provided in Table 3. Moreover, because the redox agents of Table 3 cycle between oxidized and reduced states during the thermal curing reaction, it is also expected that the corresponding reduced salts/compounds will also function as redox agents for the thermal curing reaction. That is, the corresponding copper(I) salts, iron (II) salts, and titanium (III) salts/compounds listed in Table 3 may also function as suitable redox agents.

TABLE 3

List of Redox Agents for Epoxy Adhesive Formulations

| | |
|---|---|
| copper(II) salts | copper(II) acetate, copper(II) trifluoroacetate, copper(II) isobutyrate, copper(II) octanoate, copper(II) palmitate, copper(II) stearate, copper(II) benzoate, copper(II) acetylacetonate, copper(II) trifluoroacetylacetonate, copper(II) hexafluoroacetylacetonate, copper(II) napthenate, copper(II) triflate, copper(II) methanesulfonate |
| iron(III) salts | iron(III) acetate, iron(III) acetylacetonate, iron(III) tartrate |
| titanium(IV) salts/compounds | titanium(IV) isopropoxide, bid(cyclopentadienyl)titanium(IV) bis(trifluoromethansulfonate), bis(η-5-2,4-cylcopentadien-1-yl)-bis(2,6-difluoro-3-(1H-pyrrol-1-yl)-phenyl) titanium |

Although generally less reactive than the copper(II) salts, thermal curing reactions using the iron(III) salts and the titanium(IV) salts and compounds described above may be accelerated by the addition of sacrificial reducing agents (see further details below).

Sacrificial Reducing Agents

To aid in cycling of the redox agent in the thermal curing step, the dual cure epoxy adhesives of the present disclosure may optionally include about 0.05% to about 0.5% of one or more sacrificial reducing agents. The optional sacrificial reducing agents may be selected from ascorbic acid, sodium ascorbate, and ascorbyl palmitate, among other known sacrificial reducing agents. As explained further below, applicants have found that the addition of such sacrificial agents generally leads to an increase in thermal curing rates.

Other Optional Additives

A variety of optional additives may be included in the adhesive formulations to impart desired properties that improve the processing and/or behavior of the adhesives. For example, fumed silica may be added to impart thixotropic properties, silane coupling agents may be added to promote adhesion, and/or surfactants may be added to improve wetting properties. Other such additives apparent to those with ordinary skill in the art may also be included. In general, the optional additives may be present at relatively low concentrations in a range of about 0.05% to about 3% by weight, although higher or lower concentrations may be used in some circumstances.

Influence of Copper(II) Salts on Thermal Curing

In one set of studies, applicants evaluated the influence of copper(II) stearate on the rates of thermal curing of an epoxy adhesive formulation. The tested formulations included bisphenol-A diglycidyl ether, a cycloaliphatic epoxy, PAG-F, TAG-B, an epoxysilane adhesion promoter, and varying concentrations of copper(II) stearate. When one such formulation lacking copper(II) stearate was exposed to 5 Joules (J) of 365 nm light from an LED, the formulation was solid and not tacky, and the epoxy groups were approximately 70% polymerized as determined by Fourier transform infrared spectroscopy (FT-IR). Such results indicate successful photochemical curing with monochromatic 365 nm light.

Figure 3:
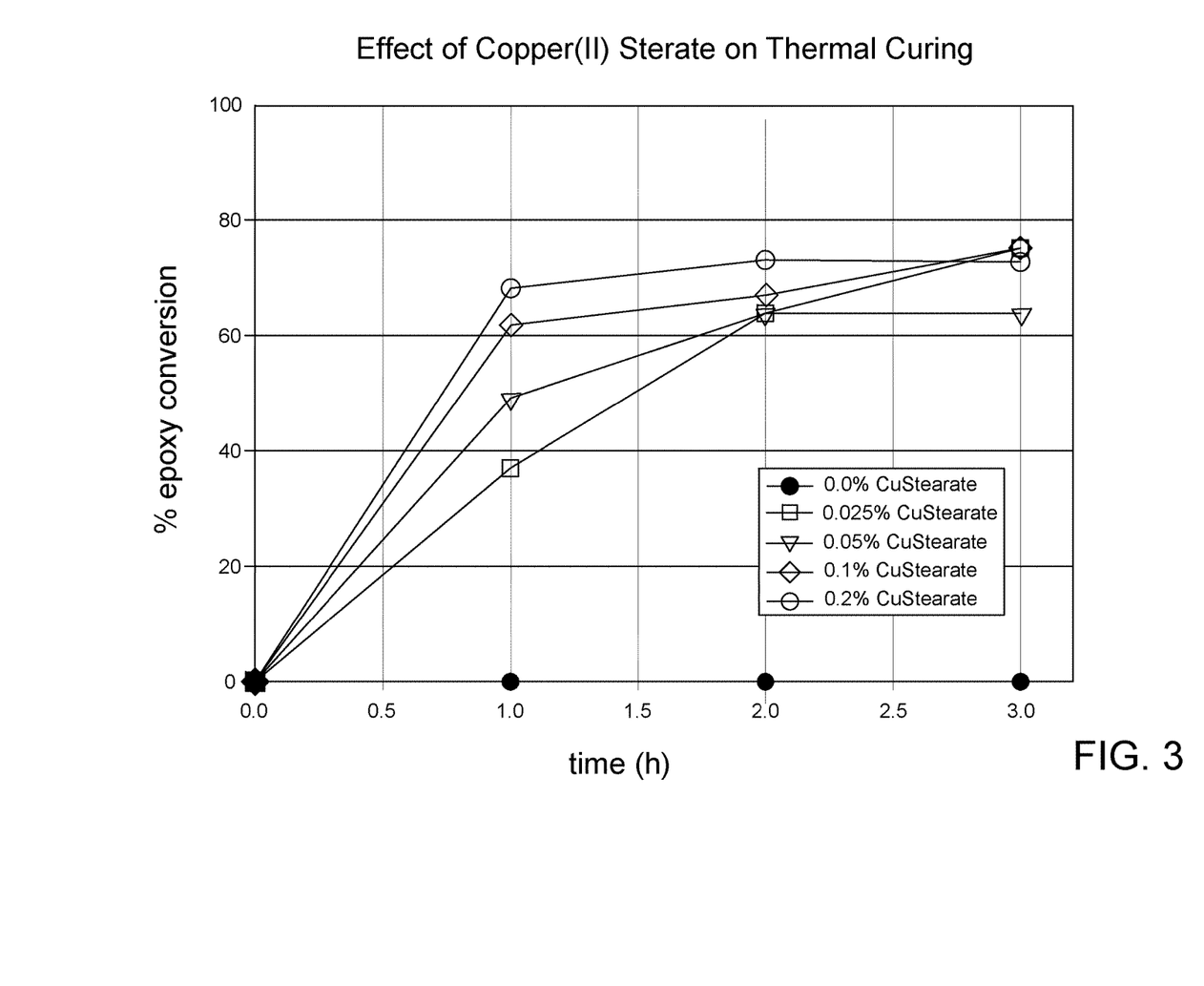
FIG. 3 is a data plot showing the effect of copper(II) stearate on thermal curing of a mixture of polymerizable epoxides containing PAG-F and TAG-B at 100° C. The % epoxy conversion was determined by FT-IR.

The thermal curing rates in a set of formulations containing varying amounts of copper(II) stearate (about 0% to about 0.2% by weight) were evaluated. The formulations were heated in a convection oven at 100° C., and the rates of epoxy polymerization (or % epoxy conversion) for each formulation was evaluated by FT-IR. The results of the evaluation are plotted in FIG. 3. As can be seen, in the absence of copper(II) stearate, no epoxy conversion was observed after three hours of heating at 100° C. However, in the presence of small concentrations of copper(II) stearate (about 0.1% to about 0.2% by weight), more than 60% epoxy conversion was observed after one hour of curing at 100° C. It is noted that an epoxy conversion of approximately 70% is considered complete curing for these formulations. Accordingly, even small concentrations of copper (II) salt may substantially accelerate TAG-induced thermal curing rates.

Influence of Sacrificial Reductants on Thermal Curing

In another set of studies, the influence of sacrificial reductants on thermal curing rates was evaluated. The tested formulations included a bisphenol-A diglycidyl ether, a cycloaliphatic epoxy, about 3% by weight of TAG-A, about 0.1% by weight of iron(III) acetylacetonate as the redox agent, and varying concentrations of ascorbyl palmitate ranging from 0% to about 1.0% by weight. When irradiated with 10 J of UV light from a medium pressure mercury lamp with a major component of about 323 nm light, the formulation containing no ascorbyl palmitate was solid and non-tacky, and approximately 80% epoxy conversion was observed by FT-IR. When the same formulation containing no ascorbyl palmitate was irradiated with 10 J of 365 nm light from and LED, low epoxy conversion (about 20%) was observed, as expected.

Figure 4:
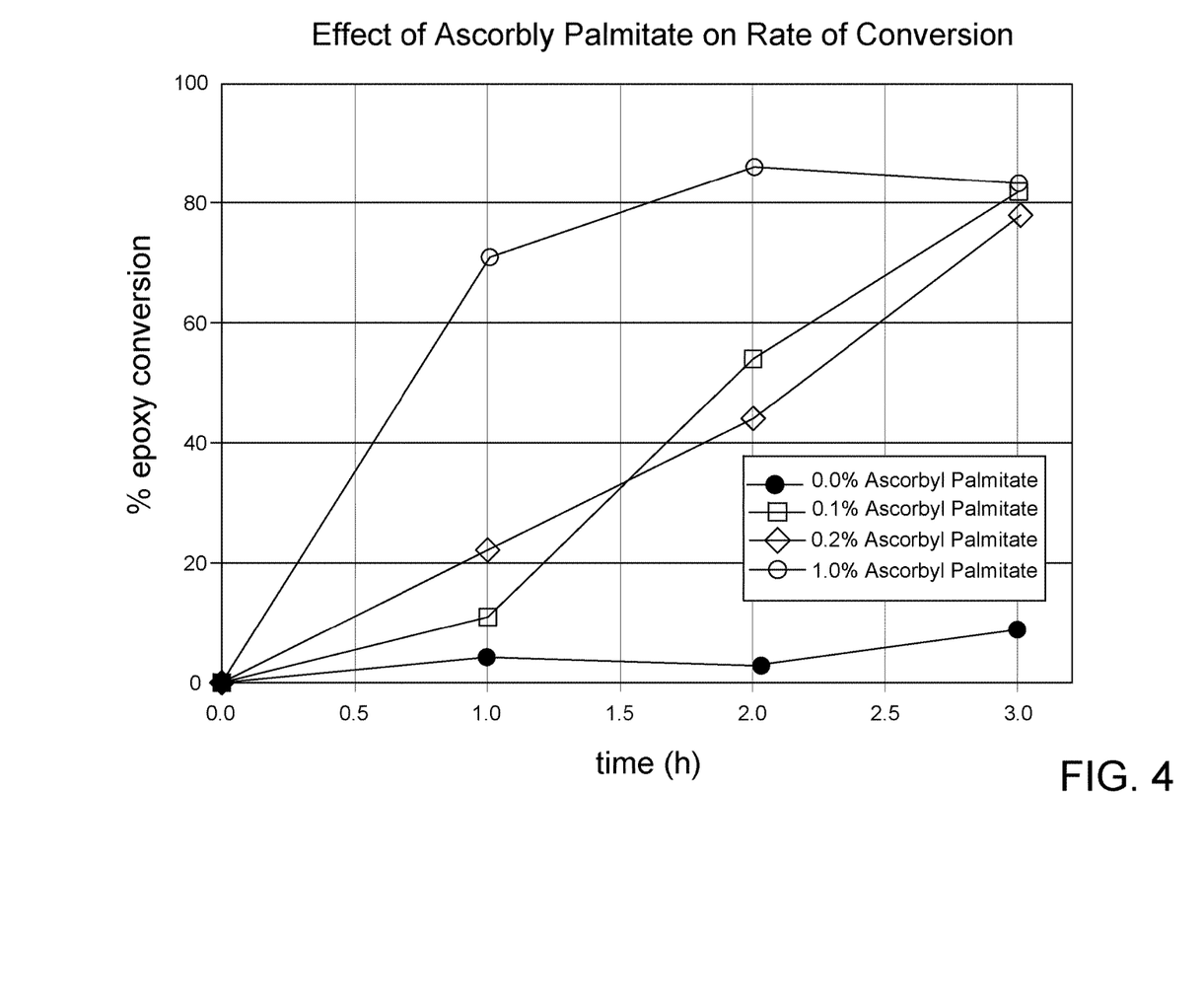
FIG. 4 is a data plot showing the effect of added ascorbyl palmitate on thermal curing of a mixture of polymerizable epoxides containing TAG-A and iron(III) acetylacetonate at 125° C. The % epoxy conversion was determined by FT-IR.

FIG. 4 shows the thermal curing rates of the formulations having varying concentrations of ascorbyl palmitate when heated at 125° C. Although a low level of curing was observed with no added ascorbyl palmitate, epoxy polymerization was greatly accelerated by addition of as little as 0.1% by weight of ascorbyl palmitate. In addition, in the presence of 1% by weight of ascorbyl palmitate, epoxy conversion was effectively complete (i.e., more than about 70% converted) after only one hour. Thus, it can be seen that thermal curing rates in the dual cure, all epoxy adhesive compositions disclosed herein may be enhanced by addition of low concentrations of sacrificial reductants.

Evaluation of Redox Agents

The copper(II) salts, iron(III) salts, and titanium(IV) salts/compounds listed above were evaluated for their effectiveness as redox agents in the thermal curing reaction. The tested mixtures contained the cycloaliphatic epoxide 3,4-epoxycyclohexylmethyl-3',4'-epoxycyclohexancarboxylate, about 2% by weight of TAG-A, and varying concentrations (from about 0.1% by weight to about 1% by weight) of the redox agents of Table 3. The formulations were heated to temperatures of between about 100° C. to about 125° C. for a period of 1 to 2 hours, and epoxy conversions were evaluated by FT-IR.

For the control reactions (lacking redox agent), less than 5% polymerization (or epoxy conversion) was observed with heating at 125° C. for 2 hours. In contrast, for the test mixtures containing copper(II) salts, good epoxy conversions were observed, and exceeded 80% in some cases. Good epoxy conversions (>40%) were also observed for the test mixtures containing titanium(IV) salts/compounds when heated at 125° C. for 2 hours. However, low epoxy conversions were observed in the test mixtures containing iron(III) salts when heated at 125° C.

A second set of evaluations were performed for the iron(III) salts and titanium(IV) salts/compounds listed in Table 3. The test mixtures were the same as above with the exception that 1% ascorbyl palmitate was added. As evaluated by FT-IR, good epoxy conversions were observed for all of the test formulations containing the iron(III) salts and the titanium(IV) salts/compounds when the formulations were heated at 125° C. for 2 hours, demonstrating an enhancement in thermal curing in the presence of ascorbyl palmitate. In addition, studies conducted with copper(II) acetylacetonate and copper(II) stearate as redox agents also demonstrated similar enhancements in epoxy conversion in the presence of ascorbyl palmitate.

Based on the above results, applicants conclude that any copper(II) salt, iron(III) salt, or titanium(IV) salt/compound will likely serve as effective redox agents for the thermal curing reactions, although a sacrificial agent may be added to boost reaction rates and/or to lower heating temperatures in some circumstances.

Room Temperature Stability Tests

Typically, dispensing of the dual cure epoxy adhesive will be performed at room temperature from a light-protected syringe or other dispensing device. Therefore, the adhesive formulations should be stable (i.e., without the occurrence of significant curing (or gelation)) for the period of use of the dispensing device. For practical use, this so-called "pot life" should be at least one day, with several days being preferable. Viscosity measurements are a sensitive method to detect if curing (or gelation) is occurring during storage. In order to assess the room temperature stability of the epoxy adhesive compositions disclosed herein, several epoxy adhesive formulations were prepared in accordance with the present disclosure and stored at 25° C., with viscosity measurements being performed periodically over several days. Typical stability results of three similar epoxy adhesive formulations are shown in Table 3. As can be seen, the formulations are stable for at least three to four days, and show slight increases in viscosity after four or five days suggesting the onset of gelation. Based on studies such as these, applicants have found that most of the epoxy adhesive formulations of the present disclosure are stable (without significant curing) at room temperature for at least five days when stored in a light-protected container, with some being stable for two weeks or more.

TABLE 4

Viscosity Measurements to Assess Room Temperature Stability of Epoxy Adhesives

| Formulation | Viscosity[a] | | | | |
| --- | --- | --- | --- | --- | --- |
| | 0 hours | 48 hours | 72 hours | 96 hours | 120 hours |
| L0 | 2440 | 2430 | 2460 | 2530 | 2640 |
| L1 | 2470 | 2480 | 2540 | 2590 | 2680 |
| L2 | 2750 | 2760 | 2780 | 2840 | 2940 |

[a]Viscosity given in centipoise (cps) and measured at 25 ± 0.5° C.

Examples of Epoxy Adhesive Formulations

Five example working epoxy adhesive formulations are provided in Tables 5-9 below.

TABLE 5

Example 1

| Weight % | Ingredient |
| --- | --- |
| 50 | diglycidyl ester of hexahydrothalic acid |
| 45.45 | 3,4-epoxycylclohexylmethyl 3',4'-epoxycyclohexane carboxylate |
| 1.5 | PAG-F |
| 3.0 | TAG-B |
| 0.05 | copper(II) napthenate |

TABLE 6

Example 2

| Weight % | Ingredient |
|---|---|
| 50 | diglycidyl ester of hexahydrophthalic acid |
| 46.95 | 3,4-epoxycylclohexylmethyl 3',4'-epoxycyclohexane carboxylate |
| 1.5 | PAG-D |
| 1.5 | TAG-A |
| 0.05 | bis(η-5-2,4-cylcopentadien-1-yl)-bis(2,6-difluoro-3-(1H-pyrrol-1-yl)-phenyl) titanium |

TABLE 7

Example 3

| Weight % | Ingredient |
|---|---|
| 45.2 | 2,2-bis[4-(glycidyloxy)phenyl]propane |
| 50 | diglycidyl ester of hexahydrophthalic aicd |
| 1.5 | PAG-C |
| 3.0 | TAG-C |
| 0.1 | copper(II) stearate |
| 0.2 | ascorbyl palmitate |

TABLE 8

Example 4

| Weight % | Ingredient |
|---|---|
| 43.2 | 3,4-epoxycyclohexylmethyl 3',4'-epoxycyclohexane carboxylate |
| 50 | bisphenol-A diglycidyl ether |
| 1.5 | PAG-E |
| 3.0 | TAG-F |
| 0.1 | copper(II) benzoate |
| 0.2 | ascorbic acid |
| 2.0 | fumed silica |

TABLE 9

Example 5

| Weight % | Ingredient |
|---|---|
| 46.75 | bisphenol-A diglycidyl ether |
| 50 | diglycidyl ester of hexahydrophthalic acid |
| 1.5 | PAG-D |
| 1.5 | TAG-A |
| 0.15 | iron(III) acetylacetonate |
| 0.1 | ascorbyl palmitate |

An example protocol for bonding a lens barrel and a lens housing of a camera module using a dual cure, all epoxy adhesive of the present disclosure is provided below.

Example Protocol:

Four dots of adhesive (ca. 0.5 mg each) are dispensed on the housing or the lens barrel of the module. The barrel and housing are mated with precise alignment. The device is irradiated for about 5-10 seconds with 365 nm light from an LED with a power of 100 milliwatts per centimeter squared (mW/cm$^2$). The fixed and aligned module is then heat cured at 80-85° C. for 1 to 2 hours.

INDUSTRIAL APPLICABILITY

It can be seen from the above that the dual cure, all epoxy adhesive compositions disclosed herein may have applicability in a number of applications that rely on dual cure adhesives for bonding components such as, but not limited to, semiconductor and optoelectronic packaging applications. More broadly, the epoxy adhesive compositions disclosed herein may find applicability in any such application having the processing requirements of active alignment, the presence of shaded regions, and/or sensitivity to high temperatures (e.g., above about 70° C. or above about 90° C.). Other applications that may derive a benefit from the superior performance properties of an all epoxy adhesive, that is free of acrylate compounds or bismaleimide compounds, may also find use for the adhesive compositions of the present disclosure.

The adhesive compositions disclosed herein are dual cure, all epoxy adhesives that contain a PAG and a TAG to enable both photochemical and thermal curing. Applicants are unaware of any other all epoxy adhesive compositions that are curable both photochemically and thermally. Thus, the all epoxy adhesives disclosed herein may reduce reliance on current dual cure hybrid resins. Moreover, in contrast to many thermally curable epoxy adhesives that undergo polymerization via condensation reactions involving basic components, the epoxy adhesives disclosed herein undergo acid-catalyzed polymerization for both the thermal and photochemical curing reactions. In addition, the epoxy adhesives of the present disclosure are thermally curable at relatively low temperatures (about 70° C. to about 130° C.), making them suitable for use in many applications having temperature-sensitive components. Although a few examples of epoxy resin compositions that undergo acid-catalyzed polymerization in the presence of low temperature heat are known in the prior art, such compositions are highly reactive and often cure/gelate before they can be processed at room temperature. By contrast, the epoxy adhesive compositions disclosed herein have carefully optimized concentrations of redox agents to slow room temperature curing rates and increase storage stability. More specifically, applicants have found that by limiting the concentration of redox agents to a relatively low range, the compositions may be stored at room temperature for several days or more, thereby greatly facilitating handling.

What is claimed is:

1. A dual cure, all epoxy adhesive, comprising:
   at least about 93% by weight of one or more polymerizable epoxides, the polymerizable epoxide being the only polymerizable compound in the adhesive;
   a catalytic amount of a photo-acid generator (PAG) configured to induce acid-catalyzed polymerization of the polymerizable epoxide when exposed to UV or visible light, the PAG being selected from a sulfonium salt and a sulfonate ester;
   about 0.01% to about 1% by weight of a redox agent; and
   a catalytic amount of a thermal acid generator (TAG) configured to induce acid-catalyzed polymerization of the polymerizable epoxide in the presence of the redox agent when exposed to a temperature at or above about 70° C., the dual cure, all epoxy adhesive being curable by either one of photochemical treatment and thermal treatment.

2. The dual cure, all epoxy adhesive of claim 1, wherein redox agent selected from the group consisting of copper(II) salts, iron(III) salts, titanium(IV) salts, and titanium(IV) compounds.

3. The dual cure, all epoxy adhesive of claim 2, wherein the redox agent is a copper(II) salt selected from the group consisting of copper(II) acetate, copper(II) trifluoroacetate, copper(II) isobutyrate, copper(II) octanoate, copper(II) palmitate, copper(II) stearate, copper(II) benzoate, copper (II) acetylacetonate, copper(II) trifluoroacetylacetonate, copper(II) hexafluoroacetylacetonate, copper(II) napthenate, copper(II) triflate, and copper(II) methanesulfonate.

4. The dual cure, all epoxy adhesive of claim 1, wherein the PAG is selected from the group consisting of diphenyl[4-(phenylthio)phenyl]sulfonium hexafluoroantimonate, diphenyl[4-(phenylthio)phenyl]sulfonium hexafluorophosphate, a mixture of diphenyl[4-(phenylthio)phenyl]sulfonium bis(heptafluoropropyl)tetrafluorophosphate and diphenyl[4-(phenylthio)phenyl]sulfonium tris(heptafluoropropyl)trifluorophosphate, a mixture of diphenyl[4-(phenylthio)phenyl]sulfonium hexafluoroantimonate and bis(4-diphenylthiophenyl)sulfide bis(hexafluoroantimonate), a mixture of diphenyl[4-(phenylthio)phenyl]sulfonium hexafluorophosphate and bis(4-diphenylthiophenyl)sulfide bis(hexafluorophosphate), tris[4-(4-acetylphenylthio)phenyl]sulfonium tetrakis(pentafluorophenyl) borate, tris[4-(4-acetylphenylthio)phenyl]sulfonium tris(trifluoromethylsulfonyl) methide, and 2,3-dihydro-α-(2-methylphenyl)-2-[[[(4-methylphenyl)sulfonyl]oxy]imino]-thiopheneacetonitrile.

5. The dual cure, all epoxy adhesive of claim 4, wherein the PAG induces acid-catalyzed polymerization when exposed to 365 nm light.

6. The dual cure, all epoxy adhesive of claim 1, wherein the TAG is a diaryliodonium salt having a counterion selected from the group consisting of hexafluorophosphate, hexafluoroantimonate, tetrakis(pentafluorophenyl)borate, bis(heptafluoropropyl)tetrafluorophosphate, tris(heptafluoropropyl)trifluorophosphate, triflate, and perfluoro-1-butanesulfonate.

7. The dual cure, all epoxy adhesive of claim 1, wherein the TAG is selected from the group consisting of p-(octyloxyphenyl)phenyliodonium hexafluoroantimonate, (p-isopropylphenyl)(p-methylphenyl)iodonium tetrakis(pentafluorophenyl)borate, a mixture of (p-isopropylphenyl)(p-methylphenyl)iodonium bis(heptafluoropropyl)tetrafluorophosphate and (p-isopropylphenyl)(p-methylphenyl)iodonium tris(heptafluoropropyl)trifluorophosphate, bis(4-methylphenyl)iodonium triflate, bis(4-tert-butylphenyl)iodonium perfluoro-1-butanesulfonate, and (p-isobutylphenyl)(p-methylphenyl)iodonium hexafluorophosphate.

8. The dual cure, all epoxy adhesive of claim 1, further comprising an additive selected from fumed silica, a silane coupling agent, and a surfactant.

9. The dual cure, all epoxy adhesive of claim 1, further comprising about 0.05% to about 1.0% by weight of a sacrificial reducing agent.

10. The dual cure, all epoxy adhesive of claim 9, wherein the sacrificial reducing agent is selected from the group consisting of ascorbic acid, sodium ascorbate, and ascorbyl palmitate.

11. The dual cure, all epoxy adhesive of claim 1, wherein the thermal acid generator (TAG) is configured to induce acid-catalyzed polymerization of the polymerizable epoxide in the presence of the redox agent when exposed to temperatures in a range of from about 70° C. to about 130° C.

12. The dual cure, all epoxy adhesive of claim 1, wherein the PAG is a sulfonium salt having a counterion that forms a superacid when protonated, or a sulfonate ester that hydrolyzes to form a superacid.

13. The dual cure, all epoxy adhesive of claim 1, wherein the TAG is a diaryliodonium salt having a counterion that forms a superacid when protonated.

14. The dual cure, all epoxy adhesive of claim 1, wherein the redox agent is an iron(III) salt, a titanium(IV) salt, or a titanium(IV) compound selected from the group consisting of iron(III) acetate, iron(III) acetylacetonate, iron(III) tartrate, titanium (IV) isopropoxide, and bis(η-5-2,4-cylcopentadien-1-yl)-bis(2,6-difluoro-3-(1H-pyrrol-1-yl)-phenyl) titanium.

15. The dual cure, all epoxy adhesive of claim 1, wherein the dual cure, all epoxy adhesive comprises less than 0.1% by weight of the redox agent.

\* \* \* \* \*